United States Patent [19]

Schneider et al.

[11] Patent Number: 4,770,278
[45] Date of Patent: Sep. 13, 1988

[54] AUTOMATIC ADJUSTMENT DEVICE FOR INTERNAL SHOE BRAKES

[75] Inventors: Wilhelm Schneider, Mannheim; Klaus Lattrell, Ludwigshafen, both of Fed. Rep. of Germany

[73] Assignee: Deutsche Perrot-Bremse GmbH, Mannheim, Fed. Rep. of Germany

[21] Appl. No.: 19,614

[22] Filed: Feb. 27, 1987

[30] Foreign Application Priority Data

Mar. 12, 1986 [DE] Fed. Rep. of Germany ....... 3608234

[51] Int. Cl.$^4$ .......................... F16D 51/00; F16F 1/34; F16F 1/00
[52] U.S. Cl. .................... 188/343; 188/79.62; 267/161; 267/182
[58] Field of Search .............. 188/79.5 R, 79.5 SC, 188/79.5 S, 79.5 K, 343, 106 F, 196 BA, 196 B, 79.5 GE, 79.5 GC; 74/110, 526; 411/147, 154; 267/150, 160, 161, 180, 182; 192/111 A, 83, 93 C

[56] References Cited

U.S. PATENT DOCUMENTS

| 236,624 | 1/1881 | Pratt | 411/147 |
| 1,768,842 | 7/1930 | Holdsworth | 267/161 X |
| 4,360,086 | 11/1982 | Bond et al. | 188/343 |
| 4,365,791 | 12/1982 | Orain et al. | 267/166 |

FOREIGN PATENT DOCUMENTS

| 0858343 | 7/1949 | Fed. Rep. of Germany . |
| 2343860 | 3/1974 | Fed. Rep. of Germany ...... 188/343 |
| 2401384 | 7/1975 | Fed. Rep. of Germany ...... 188/343 |
| 3228796 | 2/1984 | Fed. Rep. of Germany ..... 188/79.5 K |
| 0212902 | 4/1941 | Switzerland . |

Primary Examiner—Andres Kashnikow
Assistant Examiner—Robert J. Oberleitner
Attorney, Agent, or Firm—Holman & Stern

[57] ABSTRACT

An automatic adjustment device for internal shoe brakes, comprises a fixed housing disposed interiorly of a rotating brake drum, a slidably guided, non-rotatable, axially displaceable pressure element disposed in the housing and operated mechanically or by a pressurized fluid, the pressure element acting on the brake shoe via a rotatable adjustment bushing and an adjusting bolt which is screw-connected to the adjustment bushing and is non-rotatably connected to the brake shoe, and a ring rotatably mounted in the pressure element. A first end face of the ring rests against a spring which presses against the base of the pressure element, and a second end face of the ring rests against the end face of the adjustment bushing which extends into the interior of the pressure element. The ring has an inclined slot engaged by a pin element affixed to the housing. The mutually facing end faces of the ring and adjustment bushing form a ratchet-like unidirectional clutch. In order to achieve high reliability against breakage and long service life of the spring, it is comprised of a steel wire having a circular cross section which is bent into a ring shape with an open gap and further formed into an arcuate shape following a cylindrical surface when viewed radially.

20 Claims, 1 Drawing Sheet

AUTOMATIC ADJUSTMENT DEVICE FOR INTERNAL SHOE BRAKES

BACKGROUND OF THE INVENTION

1. Field of the Invention

The invention relates to an automatic adjustment device for internal shoe brakes, comprising a fixed housing disposed interiorly of a rotating brake drum, and a slidably guided, non-rotatable, axially (with respect to itself) displaceable pressure element disposed in the housing and operated mechanically or by a pressurized fluid. The pressure element acts on the brake shoe, via an adjustment bushing mounted in the pressure element in the housing, and via an adjusting bolt which is screw-connected to the adjustment bushing and is non-rotatably connected to the brake shoe.

2. Description of the Prior Art

In an automatic adjustment device of this general type described in German Pat. No. 2,631,704, the spring comprises a sheet having a rectangular cross section and is deformed to have a corrugated shape. This corrugated sheet spring is intended to press the ring (having the slot) against the adjustment bushing and thereby to hold the sawtoothed faces of the unidirectional clutch means together in engagement.

Although this well-known automatic adjustment device has proven to be the best available, it has been found that the corrugated sheet spring is subject to huge variations in service life under the frequently changing loads. This nonuniformity of service life is attributable to the manufacturing technique, namely it is attributable to wear phenomena on the stamping tooling. As is well known to one skilled in the art, when the sheet spring is stamped a punch burr or ridge is generated on the spring, on the exit side of the tool, which burr or ridge is more marked when the state of wear of the stamping tool is more advanced. The presence of this burr or ridge increases the chance of crack formation in the sheet spring, leading sooner or later to failure of the spring under load. Accordingly, attempts have been made to remove the burr or ridge, by special treatment of the stamped sheet spring. The treatment used is known as "Trowalizing". It is carried out in a grinding apparatus having a working container in the form of a helical path. The mixture of corrugated sheet springs and grinding bodies (namely small, shaped stones) is passed in a circular (i.e. helical) path from the bottom to the top level of the working container. However, an hour of such treatment is not sufficient to completely remove the burrs and ridges which may be present on the corrugated shape of the sheet spring. Moreover, it has been found that even after this relatively costly treatment the service life of the corrugated sheet springs still has wide variations. Accordingly,it is frequently necessary to replace broken corrugated sheet springs, which is a time-consuming and expensive procedure.

BRIEF SUMMARY OF THE INVENTION

The object of the invention is to improve the general type of automatic adjustment device above with regard to the spring which holds the sawtoothed faces of the unidirectional clutch means in mutual engagement resulting in greater service life.

This objective is achieved according to the invention in that the spring is comprised of a steel wire with a circular cross section which is bent into a ring shape, with the ring being open and the ring is further formed into an arcuate shape when viewed radially, such as on a cylindrical surface.

The particular spatial configuration of the ring of this invention is such that its arcuate curvature, or arcuate radius, increases with increasing load. As a result, the free lever arm of the spring decreases with increasing load, and therefore the stress in the spring does not increase, but remains the same. Therefore, in comparison to a corrugated sheet spring the inventive spring has much longer and more uniform service life. Because the steel wire has a circular cross section, the spring is also free of sharp edges which can be starting points for crack formation.

More particularly the ring is rotatably mounted in the pressure element and has a first end face which rests against a spring which presses against the base of the pressure element, and a second end face which rests against the end face of the adjustment bushing, the adjustment bushing extending into the interior of the pressure element. The ring has an inclined slot engaged by a pin element fixed in the housing against movement either in the circumferential direction of the ring or in the axial direction of the ring. The mutually facing end faces of the ring and the adjustment bushing are provided with sawtoothed surfaces which together form a ratchet-like unidirectional clutch means which prevents rotation of the adjustment bushing with respect to the ring when the ring is rotated in the direction in which the adjustment bushing screws out of the rotationally fixed adjusting bolt, the rotation of the ring occuring during the inwardly directed sliding movement of the pressure element.

BRIEF DESCRIPTION OF THE DRAWINGS

An embodiment of the spring of the invention will now be described in greater detail with reference to the accompanying drawings wherein.

DETAILED DESCRIPTION

A housing 1 is disposed interiorly of a brake drum between two neighboring brake shoe ends, where it is affixed to a brake mask. The housing 1 is symmetrical, with two identical halves. Accordingly only one half will be described.

Figure 2:
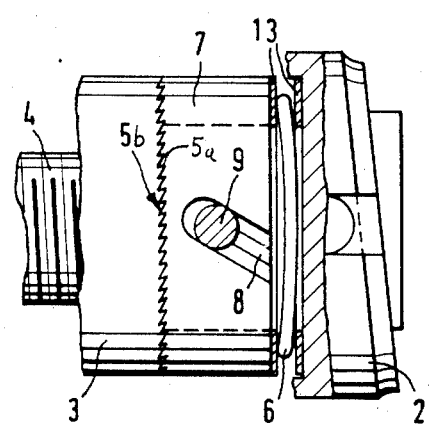
FIG. 2 is an enlarged partial cross-sectional view taken along line II—II of FIG. 1.

Two pressure elements 2 are axially (with respect to themselves) displaceably accommodated in housing 1 ahd are prevented from rotating with the drum. In the embodiment shown, the elements 2 are spread apart by means of a wedge 14. Rotatable adjustment bushings 3 are installed in the elements 2. Each bushing 3 has a ring-shaped flange 3a which rests against the end face of the respective pressure element 2, which face is directed away from the wedge. Each adjustment bushing 3 further has a threaded bore 3b in which an adjustment bolt 4 is screwed, the bolt being engageable with the corresponding brake shoe (not shown) such that the bolt and the shoe cannot rotate with respect to each other. A ring 7, which may be an annular member, is disposed in the ring-shaped, or annular-shaped, space bounded by the adjusting bolt 4 and the pressure element 2. A first end face of ring 7 is disposed adjacent the base of the pressure element 2, and a second end face of the ring rests against the end face of the adjustment bushing 3, and extends into the pressure element 2. The dimensions of the ring 7 are such that it is easily rotatable and to some extent axially displaceable. The juxtaposed ring-shaped end faces of the ring 7 and the adjustment bushing 3 have respectively engaging sawtooth faces 5a, 5b wherein the engaging sides of the teeth run alternately approximately normal to the end faces and at a relatively low angle to the faces, whereby the engaged structure operates as a clutch means in the form of a unidirectionally operating toothed locking device (FIG. 2). The ring 7 with its sawtooth face is pressed in the direction of operation of the brake shoe, against the ring-shaped shoulder formed by the adjustment bushing 3, by means of a spring ring 6, so that the sawtooth faces 5a, 5b of the unidirectional clutch means remain engaged.

Figures 3, 4:
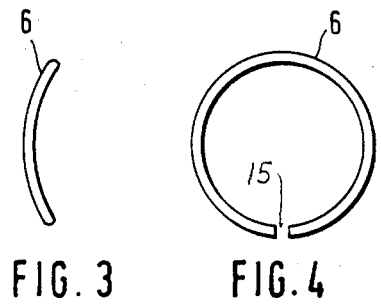
FIG. 3 is a side view of a spring ring employed in the adjustment device of FIG. 1.
FIG. 4 is a plan view of the spring ring of FIG. 3.

The spring ring 6 is disposed between two discs 13, one of which rests against the base of the pressure element 2 and the other rests against the opposing end face of the ring 7. The spring ring 6 is comprised of a steel wire of circular cross section which is bent into a ring-like shape following a cylindrical surface. To manufacture ring 6, a segment of steel spring wire of suitable length is cut and is bent around a round mandrel to yield a ring with a gap 15 between the ends (FIG. 4). This ring is then given an arcuate form, viewed radially with respect to the ring, as best shown in FIG. 3, by stamping it between a concave and convex die. It is then hardened. In the unstressed state, the gap 15 between the two ends of the steel wire should be about 1/20th the diameter of the ring. This gap facilitates deformability of the spring ring under axial stress, i.e., stress in the direction of operation of the pressure element 2.

Ring 7 has an inclined slot 8 which is engaged by a pin element 9 disposed in housing 1. Accordingly, when the ring 7 is moved axially it must execute a slight rotation corresponding to the inclination of the slot 8.

When the brakes are actuated, the spreading wedge 14 is advanced, whereby the pressure elements 2 are urged apart. Each pressure element 2 slides the associated adjustment bushing 3 outwardly, and the adjustment bushing in turn slides the adjusting bolt 4 outwardly, which bolt 4 adjoins a brake shoe. In this way the brake shoes are pressed against the drum. Thus, all the parts in FIG. 2 are moved leftward with the exception of the pin element 9. In this movement, the ring 7 is rotated slightly, corresponding to the inclination of the slot 8, said rotation being namely upwardly in FIG. 2. When subsequently the brakes are released, the parts move back under the action of a return spring which engages the brake shoes. In this movement, the ring 7 is rotated downwardly, as viewed in FIG. 2, into its starting position.

As the brake linings wear down, the excursion of the actuating parts is increased, whereby the angle of rotation of the ring 7 is also increased. If the ring 7 (FIG. 2) is rotated so far upward that the toothed surfaces 5 of the unidirectional clutch means are moved with respect to each other by the distance of one tooth, then when the back rotation downwardly occurs, the adjustment bushing 3 is rotated along with the ring 7, whereby the adjusting bolt 4 which is screwed into adjustment bushing 3 is moved axially with respect to the adjustment bushing 3, since bolt 4 is prevented from rotating. The screw means between the adjustment bushing 3 and the bolt 4 are chosen such that the bolt is moved out of the bushing 3 when the described adjustment process takes place, namely bolt 4 is moved leftwardly in FIG. 2. One can arrange the movement increment of the actuating members which is tolerated without an adjustment occurring and beyond which an adjustment takes place. This is governed by the distribution of teeth 5a, 5b on the clutch means, and by the inclination of the inclined slot 8 in the ring 7. The adjustment distance of the brake shoes is governed by the distribution of teeth 5a, 5b and in conjunction therewith the pitch of the thread between the adjustment bushing 3 and the adjusting bolt 4.

When the brakes are released (returned), the friction of the pin element 9 in the slot 8 acts in the same direction during the return movement of the ring 7 as does the force of the spring ring 6. Therefore during this movement phase the toothed faces of the clutch means 5 are pressed tightly together, and the ring 7 carries along the adjustment bushing 3 as the ring itself is moved.

When the brakes are being applied, the friction of pin element 9 in inclined slot 8 works against the force of the spring ring 6, thereby reducing wear on the sides of the teeth which are inclined.

Figure 1:
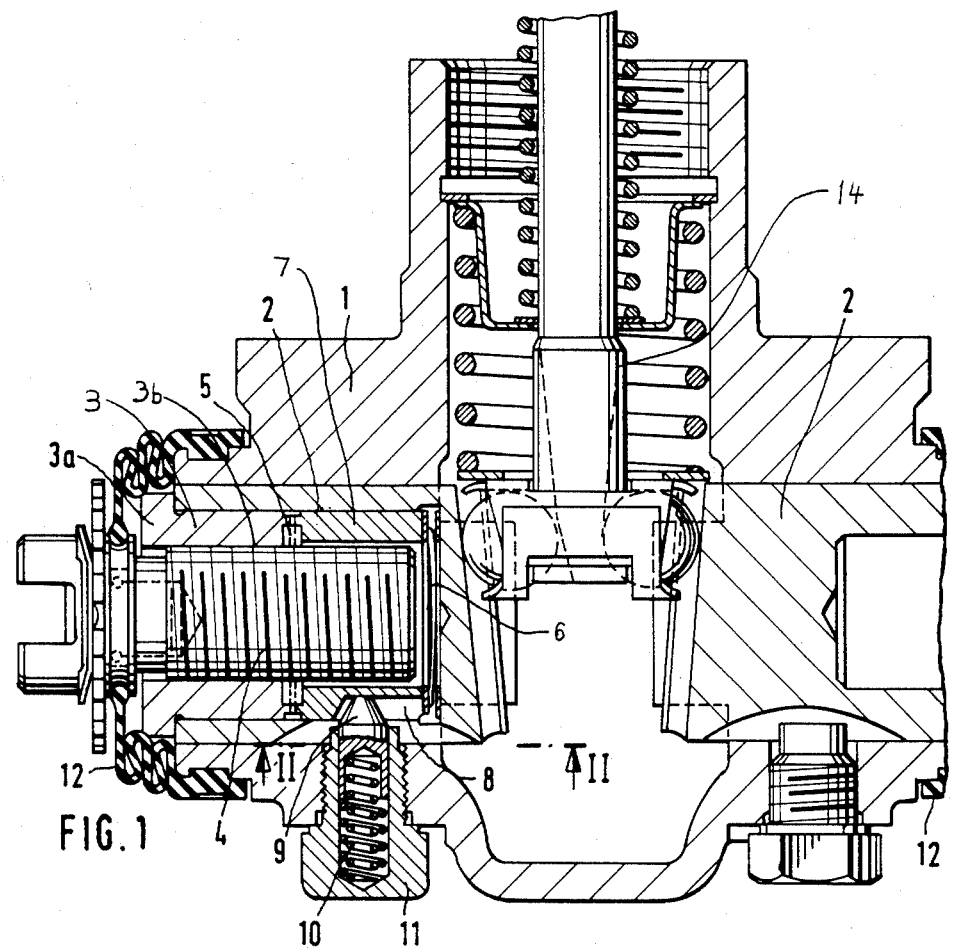
FIG. 1 is a longitudinal cross-sectional view through an automatic adjustment device in accordance with the invention.

As may be seen from FIG. 1 in particular, the pin element 9 along with two compression springs 10 is installed in the bore of a set screw 11 screwed into the housing 1. In this way the force of the compression springs 10 is applied to the pin element 9 so that said pin element elastically engages the inclined slot 8. This spring force can be adjusted by turning the set screw 11. The forward end region of the pin element, which region engages the inclined slot 8, has a conical shape and the side walls of slot 8 are beveled corresponding to the cone angle. Two folded bellows 12 seal the apparatus against external dirt.

We claim:

1. An automatic adjustment device for an internal shoe drum brake having a rotatable drum and at least one brake shoe engaged with the drum comprising:

a housing disposed adjacent a rotatable brake drum;

a pressure element slidably and non-rotatably mounted in said housing for axial displacement with respect to said housing in the direction of brake shoe expansion and retraction;

a base on the innermost portion of said pressure element;

means operatively associated with said housing for displacing said pressure element axially;

an adjustment bushing movably mounted in said pressure element and having an outer end face adjacent a brake shoe and an inner end within said pressure element;

an adjustment bolt threadedly engaging in said adjustment bushing and nonrotatably engageable with a brake shoe so that rotation of said adjustment bushing in one direction adjusts said adjusting bolt outwardly toward the brake shoe;

an adjusting ring rotatably mounted in said pressure element and having a first end face adjacent said base of said pressure element and a second end face adjacent said inner end of said adjustment bushing;

interengageable sawtooth surfaces on said inner end of said adjustment bushing and said second end face of said adjusting ring forming a ratchet-like means adapted to prevent relative rotation between said adjustment bushing and said adjusting ring in said one direction of rotation of said adjusting bushing;

inclined slot means in said adjusting ring;

pin means mounted in said housing engageable in said inclined slot means for rotating said adjusting ring when said pressure element is axially displaced; and a ring-shaped steel wire compression spring disposed between said base of said pressure element and said first end face of said adjusting ring and having a circular cross-section, two opposed ends, a gap between said opposed ends, and an arcuate form when viewed radially.

2. An automatic adjusting device as claimed in claim 1 wherein:

said compression spring means comprises a steel wire in the form of a ring.

3. An automatic adjusting device as claimed in claim 2 wherein:

said compression spring has two opposed ends and a gap between said opposed ends.

4. An automatic adjusting device as claimed in claim 3 wherein:

said compression spring is circular.

5. An automatic adjusting device as claimed in claim 4 wherein:

said compression spring has an arcuate form when viewed radially.

6. An automatic adjustment device as claimed in claim 5 and further comprising:

disc members between said compression spring means and each of said base of said pressure element and said first end face of said adjusting ring.

7. An automatic adjustment device as claimed in claim 5 wherein:

said clutch means comprises interengageable saw-toothed surfaces on said inner end of said adjusting bushing and said second end face of said adjusting ring to form a ratchet-like clutch means.

8. An automatic adjusting device as claimed in claim 2 wherein:

said compression spring has an arcuate form when viewed radially.

9. An automatic adjustment device as claimed in claim 8 and further comprising:

disc members between said compression spring means and each of said base of said pressure element and said first end face of said adjusting ring.

10. An automatic adjustment device as claimed in claim 9 wherein:

said clutch means comprises interengageable saw-toothed surfaces on said inner end of said adjusting bushing and said second end face of said adjusting ring to form a ratchet-like clutch means.

11. An automatic adjustment device as claimed in claim 3 and further comprising:

disc members between said compression spring means and each of said base of said pressure element and said first end face of said adjusting ring.

12. An automatic adjusting device as claimed in claim 1 wherein:

said compression spring is circular.

13. An automatic adjustment device as claimed in claim 1 and further comprising:

disc members between said compression spring means and each of said base of said pressure element and said first end face of said adjusting ring.

14. An automatic adjustment device as claimed in claim 1 wherein:

said clutch means comprises interengageable saw-toothed surfaces on said inner end of said adjusting bushing and said second end face of said adjusting ring to form a ratchet-like clutch means.

15. An automatic adjustment device as claimed in claim 1 wherein:

said pressure element comprises a substantially cylindrical sleeve.

16. An automatic adjustment device as claimed in claim 15 wherein:

said adjustment bushing comprises a substantially cylindrical sleeve.

17. An automatic adjustment device as claimed in claim 16 wherein:

said adjusting ring comprises an annular sleeve.

18. An automatic adjustment device as claimed in claim 1 wherein:

said adjustment bushing comprises a substantially cylindrical sleeve.

19. An automatic adjustment device as claimed in claim 18 wherein:

said adjusting ring comprises an annular sleeve.

20. An automatic adjustment device as claimed in claim 1 wherein:

said adjusting ring comprises an annular sleeve.

* * * * *